July 20, 1943.     R. W. BROWN     2,324,997
RESILIENT COUPLING
Filed Nov. 4, 1941
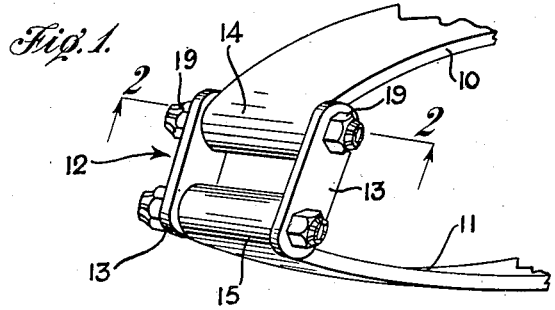
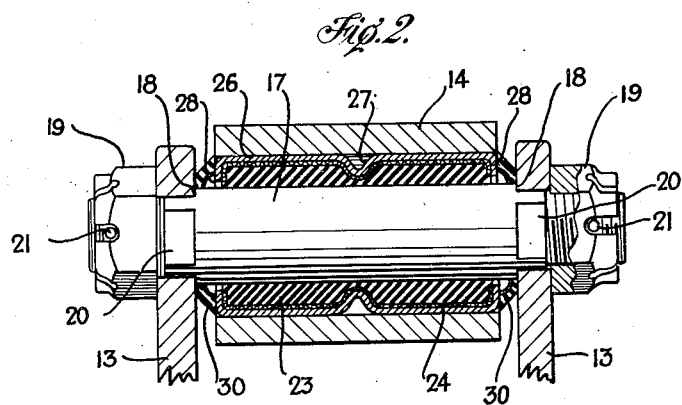
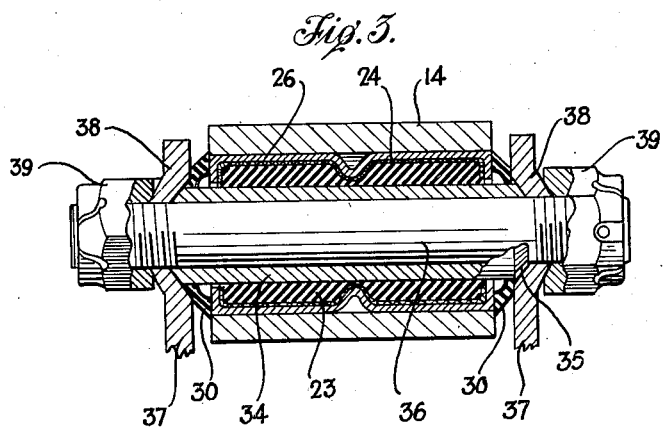
INVENTOR
Roy W. Brown
BY
ATTORNEYS Patented July 20, 1943

2,324,997

UNITED STATES PATENT OFFICE 2,324,997

RESILIENT COUPLING

Roy W. Brown, Akron, Ohio, assignor to The Firestone Tire & Rubber Company, Akron, Ohio, a corporation of Ohio Application November 4, 1941, Serial No. 417,785

3 Claims. (Cl. 267—54)

This invention relates to resilient couplings, and more specifically it relates to resilient couplings of the oscillating type.

The invention is of especial utility in its application to the spring shackles of leaf springs, and it is this embodiment of the invention that is shown and described herein, but solely for illustrative purposes.

Spring shackle couplings heretofore provided have been of two general types, namely, the all metal type wherein a metal bushing is provided between the relatively moving parts of the coupling, and the resilient type wherein a rubber sleeve is substituted for the metal bushing, and so mounted as to be subjected to torsional strain by oscillatory movement of the relatively movable elements. Each of said types of connections has its advantages and its disadvantages as is well understood by those skilled in the art, and it is the primary purpose of this invention to provide an improved coupling in which the advantageous characteristics of each is preserved.

Accordingly it is the chief object of the invention to provide a coupling of the character mentioned comprising a rubber bushing, yet which retains all the advantages of couplings employing metal bushings between relatively movable parts. More specifically the invention aims to provide such a coupling that enables unlimited angular movement of connected parts, as in couplings of the all metal type, as compared to the limited angular movement of couplings employing rubber bushings of conventional design; that includes means automatically lubricating sliding surfaces therein; that is equivalent to conventional rubber bushings in its ability to absorb vibration; and that will provide thrust resistance to relative axial movement of the cooperating parts. Other objects will be manifest as description proceeds.

Of the accompanying drawing:

Fig. 1 is a perspective view of a spring shackle embodying the invention, and leaf spring units connected thereby;

Fig. 2 is a section on the line 2—2 thereof; and

Fig. 3 is a section similar to Fig. 2 showing another embodiment of the invention.

Referring to Fig. 1 of the drawing there is shown a pair of leaf spring units 10, 11 connected at their adjacent ends by a spring shackle designated as a whole by the numeral 12. Said spring shackle comprises the conventional shackle plates 13, 13, and the latter are secured to the spring units by shackle bolts that extend axially through loops or eyes 14, 15 formed on the adjacent ends of the spring units 10, 11 respectively. The improved resilient couplings of the invention are disposed within the spring eyes 14, 15, in cooperation with the said bolts that extend therethrough, and since both couplings are of identical construction, the description of one will suffice.

As shown in Fig. 2, a shackle bolt 17 extends axially through the spring eye 14 and through the adjacent ends of the shackle plates 13 at each end thereof, said bolt being of reduced diameter where the ends thereof pass through the shackle plates 13 to provide shoulders 18 against which the shackle plates are urged by nuts 19, 19 that are threaded onto the opposite ends of the bolt. The reduced end portions of the shackle bolt are flatted at 20, 20, and are received in complementally shaped apertures in the shackle plates 13, with the result that rotary movement of the shackle bolt relatively of the plates 13 is prevented. Preferably the nuts 19 are secured against turning by cotter pins 21 as shown.

Molded onto the shackle bolt 17, in the medial region thereof and spaced somewhat from the shoulders 18, is a tubular body or bushing 23 of rubber or rubber like composition, said bushing 23 being strongly bonded to the bolt, preferably by vulcanization. Initially the bushing 23 is of uniform outside diameter, and has a peripheral surface facing 24 of friction material, such as textile fabric, bonded to its structure by vulcanization. The friction facing 24 is impregnated with lubricating material, which material must be such as not to freeze at low temperatures to which it may be subjected, and which will not exert a deleterious effect upon rubber or metal. Several lubricating compositions have been found suitable for the purpose, the preferred composition being of a thixotropic nature.

Telescopically mounted upon the rubber bushing 23 in face-to-face contact with the lubricated facing 24 thereon is a metal sleeve 26 that may be composed of steel. Initially the sleeve 26 is of tubular form, is of uniform diameter throughout, and is slightly longer than the rubber bushing 23. After the sleeve 26 is telescoped upon the bushing 23, which it embraces with an easy sliding fit, the middle of the sleeve is deformed or swaged, inwardly and circumferentially, to provide the constriction shown at 27. Also the projecting end portions of the sleeve are swaged inwardly to produce end flanges 28, 28 that overlie most of the respective end faces of the bushing 23. Such swaging of the sleeve 26 locally deforms the rubber bushing 23, and the relative diameter of sleeve and bushing is such that the deformation of the bushing does not create excessive friction between the inside face of the sleeve and the lubricated facing 24 of the bushing, and puts the bushing under but slight compressive stress.

The sleeve 26 has a force fit within the eye 14 of the spring element 10 so that in operation there is no relative movement between the eye and sleeve. Dirt seals are provided for excluding grit and moisture from the relatively movable parts of the coupling, said seals consisting of flexible washers 30 mounted upon the respective ends of the shackle bolt 17, between each plate 13 and the adjacent end of the sleeve 26, said seals bearing against the end-flanges 28 of the latter. The washers 30 may be somewhat cupped, and have a layer of friction material bonded to their respective concave faces, as shown.

In the operation of the coupling, relative movement between the leaf spring units 10, 11 produces relative angular or oscillatory movement between the shackle bolt 17 and the metal sleeve 26, with the result that the sleeve moves relatively of the bushing 23 and its facing 24, but without causing torsional deformation of the bushing because of the lubricant with which said facing is impregnated. The slight compressive stress to which the bushing normally is subject does not materially retard the easy sliding movement of the sleeve relatively of the bushing, but it does maintain the facing material in contact with the sleeve notwithstanding such wear of the facing as may result from extended use. Any relative movement of the spring units 10, 11 such as would move the sleeve 26 axially relatively of the shackle bolt 17 is resisted by the bushing 23 which is thereby subjected to compressive and shear strains by the constriction or corrugation 27 and the end flanges 28 of said sleeve. Upon such relative movement of the elements the sealing washers 30 will flex and deform without breaking contact with the sleeve flanges 28.

The improved coupling is noiseless in use, and requires no added lubricant at any time. Furthermore the rubber bushing is not subject to destructive strains such as would shorten its useful life, or which might separate it from the shackle bolt. The coupling is capable of absorbing vibration, and it achieves the other objects set out in the foregoing statement of objects.

The embodiment of the invention shown in Fig. 3 is essentially similar to that previously described, but differs therefrom in that the rubber bushing is attached to a metal sleeve instead of to the shackle bolt. Said metal sleeve, which is designated 34, is somewhat longer than the spring eye 14, and has its respective ends exteriorly beveled, said bevels being serrated or knurled, as shown at 35, and case hardened. The shackle bolt 36 employed with this type of coupling is of uniform diameter throughout its length and has threaded end portions projecting beyond the sleeve 34, said bolt having an easy sliding fit within said sleeve. The end portions of the bolt 36 extend through suitable apertures in respective shackle plates 37, and the latter are formed with respective tapered annular bosses 38 about the said bolt holes. The bosses 38 are formed by the swaging of the metal of the plates 37 outwardly from the inner faces thereof, thus producing tapered depressions or countersinks on the inner faces of said plates, in which countersinks the tapered and knurled ends of the sleeve 34 are received. Nuts 39 on the ends of the bolt 36 engage the outer faces of the bosses 38 to urge the plates 37 against the ends of the sleeve 34, the latter, because of its knurled ends 35, being thereby prevented from turning relatively of the plates 37 and bolt 36. The face of each nut 39 that engages a boss 38 preferably is countersunk as shown so as to have substantial area of contact with the boss 38.

Vulcanized upon the metal sleeve 34 is the rubber bushing 23 that has a surface facing of lubricated material 24 and is in telescopic relation with an external sleeve 26, said bushing 23 material 24 and sleeve 26 being identical with similarly designated elements of the previously described embodiment of the invention, the sleeve 26 having a force fit in the spring eye 14. This embodiment also employs the flexible sealing washers 30, which washers are mounted upon the sleeve 34 between the shackle plates 37 and the coupling, in sealing engagement with the end flanges of sleeve 26 of the latter.

Other modification may be resorted to without departing from the spirit of the invention, or the scope thereof as defined by the appended claims.

What is claimed is:

1. In a resilient coupling of oscillating type, the combination of an inner metallic member, a tubular outer metallic member surrounding the same concentrically thereof, an intermediate body of resilient composition between said members and bonded solely to said inner member, and a lubricated facing bonded to the peripheral surface of said intermediate body in contact with the confronting surface of the outer metallic member, said outer metallic member having inturned end flanges engaging the respective ends of the resilient intermediate body, and being formed with a central peripheral constriction or corrugation, said intermediate body being under such slight compressive stress as not to retard the free sliding movement of the facing thereon, relatively of said outer metallic member, when the latter is oscillated relatively of the inner metallic member.

2. A combination as defined in claim 1 wherein the inner metallic member extends beyond the other elements of the coupling at each end thereof, including resilient sealing washers mounted upon the projecting portions of the inner metallic member and engaging the end flanges of the outer metallic member.

3. A combination as defined in claim 1 in which the inner metallic member is a tubular sleeve.

ROY W. BROWN.